(12) United States Patent
Fife et al.

(10) Patent No.: US 9,148,086 B2
(45) Date of Patent: Sep. 29, 2015

(54) PHOTOVOLTAIC DC SUB-ARRAY CONTROL SYSTEM AND METHOD

(71) Applicant: Advanced Energy Industries, Inc., Fort Collins, CO (US)

(72) Inventors: John Michael Fife, Bend, OR (US); Eric Seymour, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 14/520,128

(22) Filed: Oct. 21, 2014

(65) Prior Publication Data

US 2015/0107646 A1    Apr. 23, 2015

Related U.S. Application Data

(60) Provisional application No. 61/894,047, filed on Oct. 22, 2013.

(51) Int. Cl.
| | |
|---|---|
| *H02H 3/00* | (2006.01) |
| *H02S 40/32* | (2014.01) |
| *G01R 31/40* | (2014.01) |
| *H02H 9/02* | (2006.01) |
| *H02H 3/20* | (2006.01) |
| *H02H 9/04* | (2006.01) |

(52) U.S. Cl.
CPC ............. *H02S 40/32* (2014.12); *H02H 9/02* (2013.01); *H02S 50/00* (2013.01)

(58) Field of Classification Search
USPC .............................................. 361/18
See application file for complete search history.

(56) References Cited

U.S. PATENT DOCUMENTS

| | | | |
|---|---|---|---|
| 8,466,706 | B2 | 6/2013 | Ramsey et al. |
| 2012/0139347 | A1* | 6/2012 | Hackenberg ................ 307/71 |
| 2012/0174961 | A1* | 7/2012 | Larson et al. ............. 136/246 |
| 2012/0326511 | A1 | 12/2012 | Johnson |
| 2013/0013984 | A1 | 1/2013 | Tran |
| 2013/0264883 | A1 | 10/2013 | Bhavaraju et al. |

OTHER PUBLICATIONS

Kalymuthu, Selvam, "International Search Report and Written Opion re Application No. PCT/US2014/061622", Dec. 15, 2014, pp. 9 Published in: AU.

\* cited by examiner

*Primary Examiner* — Dharti Patel
(74) *Attorney, Agent, or Firm* — Neugeboren O'Dowd PC (57) ABSTRACT

A photovoltaic energy conversion system, apparatus, and method for controlling DC sub-arrays of a photovoltaic array are disclosed. The method may include coupling each of N homerun branches from N sub-arrays to an inverter via N switches and monitoring current through each of the N homerun branches. A forward current through each of the N homerun branches is compared with a forward current threshold, and any backfeed current through any of the N homerun branches is compared with a backfeed current threshold. One or more of the N switches are opened in response to either the forward current exceeding the forward current threshold or the backfeed current exceeding a backfeed current threshold.

11 Claims, 11 Drawing Sheets

FIG. 11

PHOTOVOLTAIC DC SUB-ARRAY CONTROL SYSTEM AND METHOD

CLAIM OF PRIORITY UNDER 35 U.S.C. §119

The present application for patent claims priority to Provisional Application No. 61/894,047 entitled "PHOTOVOLTAIC DC SUB-ARRAY CONTROL SYSTEM AND METHOD" filed Oct. 22, 2013, and assigned to the assignee hereof and hereby expressly incorporated by reference herein.

BACKGROUND

1. Field

The present invention relates generally to photovoltaic energy conversion systems, and more specifically to control of sub-arrays of photovoltaic energy conversion systems.

2. Background

Figure 1:
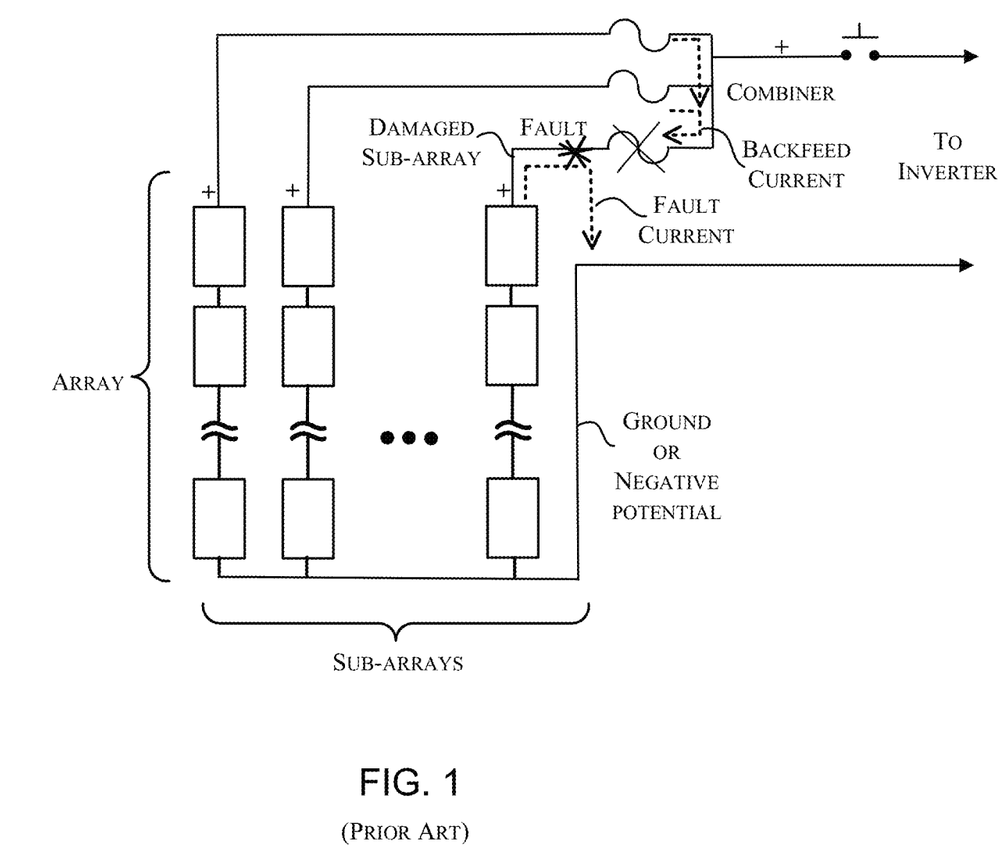
FIG. 1 is a block diagram depicting aspects of prior art photovoltaic systems.

Referring to FIG. 1, shown is a typical prior art photovoltaic (PV) system that includes a photovoltaic array that includes several sub-arrays (also referred to herein as branches). As shown, each of the sub-arrays may include a string of several PV panels (also referred to as modules), and each sub-array is typically coupled to a combiner via a corresponding fuse (as shown in FIG. 1) or a corresponding breaker. As depicted, the sub-arrays may be arranged in parallel and each sub-array may be stacked up to one of a variety of voltages (e.g., 1000 VDC) so that the DC output of the combiner provides an input to an inverter, which produces an AC voltage from the DC output of the combiner.

As depicted, when many sub-arrays are combined, there is the possibility that a damaged branch will be "back-fed" with current from the other healthy branches to which it is connected. This fault current, for a large number of combined branches, may far exceed the ampacity of the conductors used in the ailing branch. For this reason, conventionally applied protective combining (using protective devices such as fuses or breakers) is used to protect against excessive backfeed currents.

But there are several problems with this approach. For example, fuses (with associated disconnection equipment) and breakers are very expensive, and neither fuses nor breakers have "directional" settings (enabling them to open with a lower level of backfeed current), so they must be sized according to the maximum "forward" current of the sub-array. This means that it takes a substantial level of backfeed current to actuate these devices. This is problematic because backfeed current, even at small levels, can cause PV array damage. Two of the situations that can result in backfeed currents that are less than the forward current limit but high enough to cause PV array damage are a) sub-array shorts in low sunlight conditions and b) sub-array open-circuit mismatches.

In addition to the high cost and often ineffective protection that is provided by fuses or breakers, these typical protective devices only provide protection; thus the cost associated with these protective devices does not provide any added value (other than protection) to the operator of the system. As a consequence, there is a need in the art for alternative approaches to the system depicted in FIG. 1.

SUMMARY

One aspect may be characterized as a photovoltaic energy conversion system that includes a photovoltaic array including a plurality of sub-arrays, an inverter to convert direct current (DC) power from the photovoltaic array to alternating current (AC), a switching component coupled between the plurality of sub-arrays and the inverter, and a sensing component including a plurality of current sensors. Each of the current sensors is coupled to a corresponding one of the plurality of sub-arrays to provide a plurality of current signals, and each of the plurality of current signals indicates a magnitude and direction of current flowing through a corresponding one of the plurality of sub-arrays. The system also includes a protection component that receives the plurality of current signals and controls the switching component to prevent forward current through any of the sub-arrays from exceeding a forward current threshold and to prevent backfeed current through any of the sub-arrays from exceeding a backfeed current threshold.

Another aspect may be characterized as a photovoltaic DC sub-array control system that includes a sensing component to provide an indication of a magnitude and direction of current in each of N homerun branches of a photovoltaic array, a switching component disposed to switchably couple each of the N homerun branches to a DC bus, and a protection component that receives the indication of the magnitude and direction of current in each of the N homerun branches and controls the switching component to prevent forward current through any of the N homerun branches from exceeding a forward current threshold and to prevent backfeed current through any of the N homerun branches from exceeding a backfeed current threshold.

Yet another aspect may be characterized as a method for controlling DC sub-arrays of a photovoltaic array. The method may include coupling each of N homerun branches from N sub-arrays to an inverter via N switches, monitoring current through each of the N homerun branches, comparing forward current through each of the N homerun branches with a forward current threshold, and comparing any backfeed current through any of the N homerun branches with a backfeed current threshold. One or more of the N switches are opened in response to either the forward current exceeding the forward current threshold or the backfeed current exceeding a backfeed current threshold.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
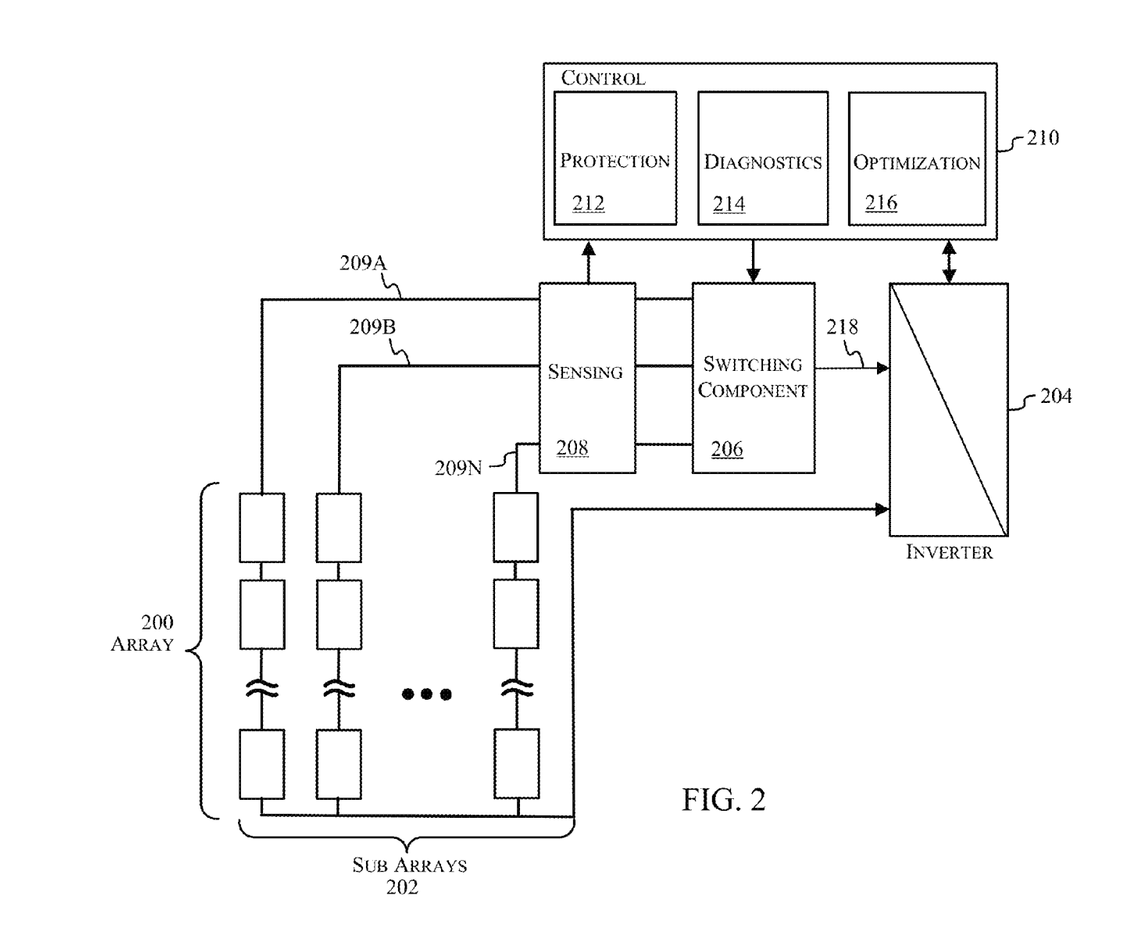
FIG. 2 is a block diagram depicting a photovoltaic energy conversion system depicting inventive aspects.

Referring to FIG. 2, shown is a photovoltaic energy conversion system depicting several inventive aspects described herein. As shown, the system includes an array 200 that includes N sub-arrays 202 that are coupled to an inverter 204 via a switching component 206. In addition, a sensing component 208 is disposed to sense power information from each of the N homeruns 209A, 209B, 209N that couple a corresponding sub-array to the switching component 206. And a control component 210 is coupled to the sensing component 208, the switching component 206, and the inverter 204. As depicted, the control component 210 includes a protection component 212, diagnostics component 214, and optimization component 216.

In general, the system depicted in FIG. 2 operates to control the switching component 206 in connection with one or more protection, diagnostic, and optimization functions. For example, some embodiments provide protection, diagnostic, and optimization functions, but other embodiments only provide protection capability. For clarity, the protection, diagnostic, and optimization components 212, 214, 216 are depicted in a single control component 210, but it should be recognized that the constructs that are utilized to realize the functions of each of these components may be distributed across different devices or integrated within a single device.

For example, the protection component 212 may be realized by dedicated hardware such as a complex programmable logic device (CPLD) or field programmable gate array (FPGA) while the diagnostic and optimization components are implemented by a common processor that executes non-transitory processor executable instructions stored in non-volatile memory. But these are only examples, and other variations are described further herein.

In general, the sensing component 208 provides information about the power that is being applied by the sub-arrays 202 to each of the homeruns 209A, 209B, 209N. For example, the power information may simply be a magnitude of the current, a magnitude of the voltage, or both. In some implementations, the sensing component 208 provides an indication of the magnitude and direction of current through each of the homeruns 209A, 209B, 209N, and an indication of the voltage of the homeruns 209A, 209B, 209N, but it is also contemplated that a voltage sensor in the inverter may be utilized to obtain an indication of the voltage of the homeruns 209A, 209B, 209N.

The switching component 206 generally operates to open and close a current path in each homerun (between a corresponding sub-array and a DC bus 218 that is coupled to the inverter 204) in connection with effectuating one or more of the protection, diagnostic, and optimization functions. As discussed further herein, in some embodiments, the switching component 206 includes N switches that are controlled simultaneously, and in other embodiments, the switching component 206 includes individually addressable switches.

Although not required, in many embodiments the inverter 204 is in communication with the control component 210 to enable the control component 210 to receive information from the inverter 204 (e.g., voltage information) and to provide information to the inverter 204 (e.g., control signals).

Figure 3:
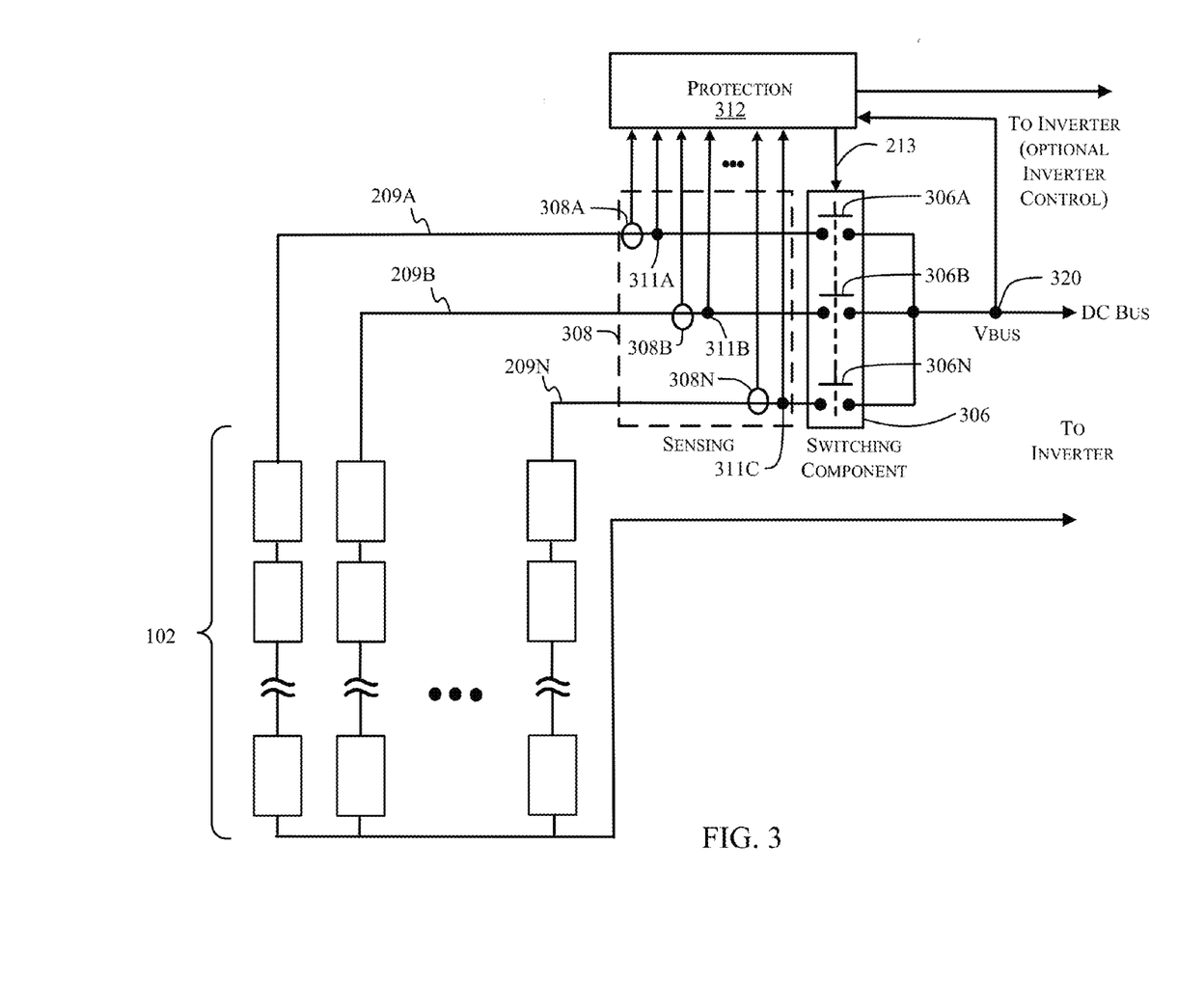
FIG. 3 is a diagram depicting operation of the protection component depicted in FIG. 2.

Referring next to FIG. 3, shown is an exemplary embodiment in which a switching component 306 includes N normally open switches 306A, 306B, 306N that are coupled together (e.g., as part of a relay) so that a single signal from the protection component 312 will open (or close) all the N normally open switches 306A, 306B, 306N. As shown, a sensing component 308 in this embodiment includes N current sensors 308A, 308B, 308N that each provide an indication of the magnitude and direction of current in a corresponding homerun branch 209A, 209B, 209N, and the protection component 312 provides a switching signal 213 to the switching component 306 based upon the direction and magnitude of the current in the homerun branches 209A, 209B, 209N.

In addition, the sensing component 308 in this embodiment includes N voltage sensors 311A, 311B, 311C, and each of the voltage sensors 311A, 311B, 311C provides an indication of the voltage of a corresponding homerun branch 209A, 209B, 209N. A bus voltage sensor 320 in this embodiment provides an indication of a voltage (Vbus) on the DC bus 218 to the protection component 312. This allows the protection component 312 to determine whether the homerun branch voltages are sufficiently close (within specified limits) to a voltage of the DC bus voltage 218 before the N switches are closed. This reduces the likelihood that the N switches 306A, 306B, 306N will be damaged when they are closed, and ensures that the N switches 306A, 306B, 306N will not be closed into a dead short.

Figure 4:
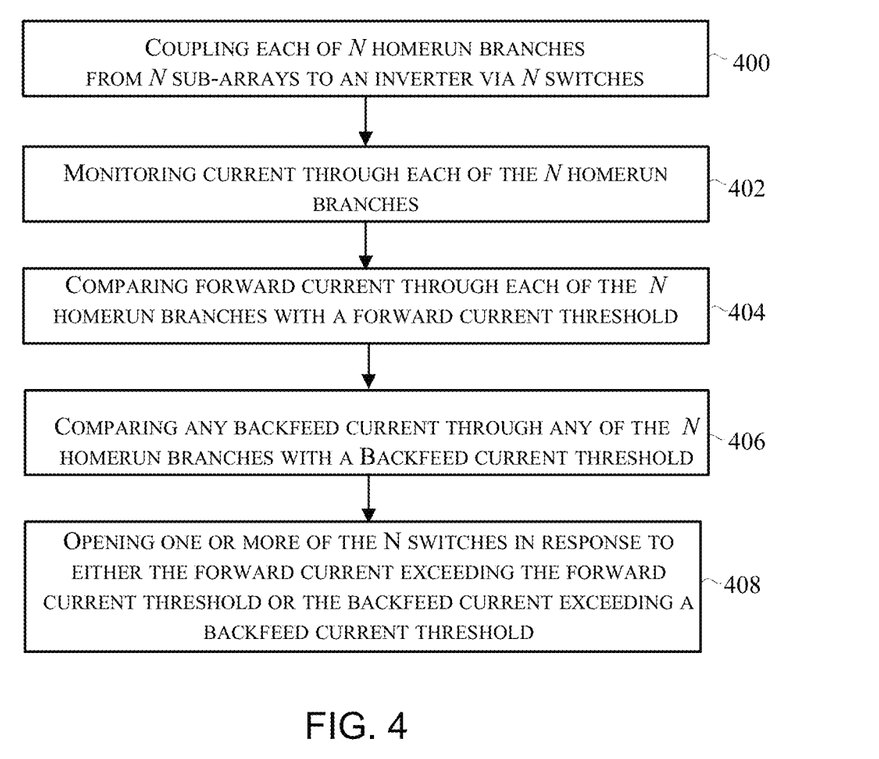
FIG. 4 is a flowchart depicting a method that may be traversed in connection with the embodiment depicted in FIG. 3.

While referring to FIG. 3, simultaneous reference is made to FIG. 4, which is a flowchart depicting a method that may be traversed in connection with the embodiment depicted in FIG. 3. As shown in FIG. 4, each of the N homerun branches 209A, 209B, 209N from the N sub-arrays 202 is coupled to an inverter 204 via N switches (Block 400). In the embodiment depicted in FIG. 3, the switches 306A, 306B, 306N are normally open switches that are mechanically coupled and integrated into a single unit (e.g., a relay) so that all the switches close (and open) simultaneously. But in alternative implementations (that may operate according to the method depicted in FIG. 4), the switches are individually addressable and are not mechanically coupled to switch together.

As shown, the current from each sub-array that is flowing through a corresponding homerun branch is monitored (Block 402). In the embodiment depicted in FIG. 3, the sensing component 308 includes N current sensors (e.g., current transducers) that are each disposed to sense the current through each corresponding homerun branch and provide a current signal, which provides an indication of the direction and magnitude of current flowing through the homerun branch, and hence, the corresponding sub-array.

The protection component 312 receives the plurality of current signals from the sensing component 308 and compares the forward current in each of the N homerun branches with a forward current threshold (Block 404), and compares any backfeed current (also referred to as reverse current) that may be occurring in a homerun branch with a backfeed current threshold (Block 406). If either the forward current in a branch exceeds the forward current threshold or any backfeed current in a branch exceeds the backfeed current threshold, one or more of the N switches are opened (Block 408).

In the embodiment depicted in FIG. 3, in which the switching component 307 includes switches that are tied together to open and close collectively, all of the switches 306A, 306B, 306N are opened in response to either a forward or backfeed current exceeding a corresponding threshold. In the embodiments where the switching component is implemented with individually addressable switches, only the switch in the homerun branch experiencing the excessive forward or backfeed current may be opened to isolate the faulty homerun branch (and corresponding sub-array) from the other homerun branches (and other corresponding sub-arrays).

In several variations of the embodiment depicted in FIG. 3, the backfeed current threshold is much less than the forward current threshold, and as a consequence, backfeed current levels that would not cause a fuse to blow (or a breaker to trip) will trigger one or more of the sub-arrays to be removed from the inverter (and disconnected from other sub-arrays). In this way, even a low level of backfeed current may trigger the faulty homerun branch (or all of the homerun branches to be isolated). The ability to isolate an ailing branch in response to a lower backfeed current enables embodiments described herein to respond to low backfeed currents that would ordinarily go undetected and would not blow a fuse or open a breaker.

In low sunlight conditions for example, a differential fault between one of the homerun branches 209A, 209B, 209N on the positive side of the array 200 and the negative side of the array 200 may cause relatively low levels of current to flow from the "healthy" homerun branches to the ailing branch, and in prior art systems (implementing fuses or breakers) that low level of current may continue to flow, which may feed an arc and cause a fire.

Another situation that may result in backfeed currents that would not trigger a fuse to blow or a breaker to trip in the prior art (because the backfeed currents are less than the forward current limit) are sub-array open circuit mismatches. In the embodiments that include individually addressable switches, specific sub-arrays may be disabled to provide additional protection against this type of hazard.

Figure 5:
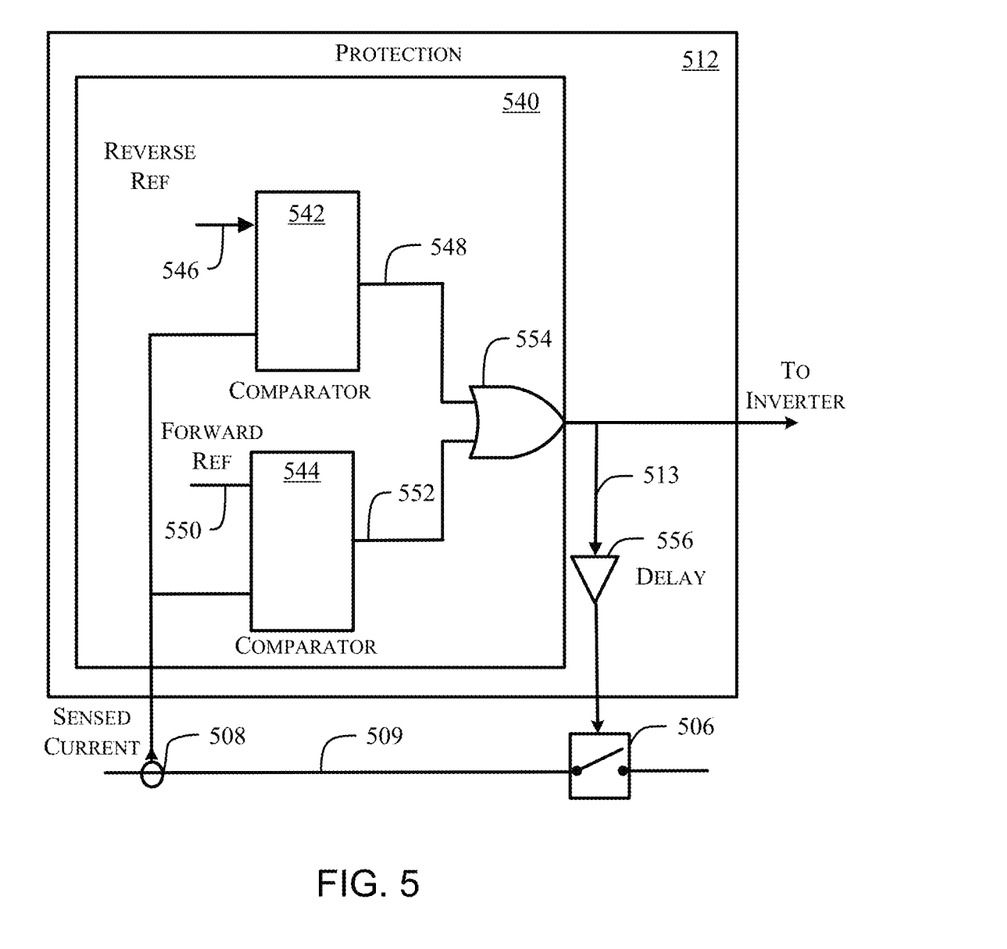
FIG. 5 is a diagram depicting aspects of an exemplary protection component.

Referring next to FIG. 5, shown is an exemplary embodiment of a protection component 512 that may be utilized to realize the protection component 212, 312 depicted in FIGS. 2 and 3. In this embodiment, logic devices (which may be realized by a programmable logic device (CPLD) or discrete analog components) are utilized to set forward and backfeed current thresholds and trigger the opening of one or more of the N switches when either the forward or backfeed current thresholds are met. As shown, the protection component 512 depicted in FIG. 5 depicts one of N dual-threshold-current-comparators 540 that includes a reverse current comparator 542 and a forward current comparator 544. As shown, each of the reverse current comparator 542 and the forward current comparator 544 are coupled to one of N current sensors 508 (e.g., one of the N current sensors 308A, 308B, 308N) that monitors current in one of the N homerun branches 509. Although only a single dual-threshold-current-comparator 540 is depicted for clarity, one of ordinary skill in the art will appreciate that the protection component 512 may include N dual-threshold-current-comparators 540 for N homerun branches of N sub-arrays.

The reverse current comparator 542 generally operates to compare the magnitude of any reverse current (also referred to herein as backfeed current) to a reverse current threshold, and provide a reverse current signal 548 if the reverse current in a homerun branch of a sub-array exceeds the reverse current threshold 546. The forward current comparator 544 generally operates to compare a magnitude of forward current to a forward current threshold 550, and to provide a forward current signal 552 if the forward current in a homerun branch of a sub-array exceeds the forward current threshold 550. As shown, the reverse current signal 548 is logically OR'd 554 with the forward current signal 552 to provide a switching signal 513 to open a switch 506 after a delay 556 if either the reverse current threshold 546 or the forward current threshold 548 are exceed.

It should be noted that in this embodiment software is not utilized in connection with the protection/safety functions of controlling the N switches. In other words, a processor is not used to execute instructions to effectuate the protection/safety functions. But in other embodiments discussed further herein, processor-based hardware is utilized that employs software—in part—to implement the protection component.

As depicted, in this embodiment the switching signal 513 is also provided to the inverter 204 so that the inverter 204 may reduce or completely eliminate the current being drawn so that the one or more N switches may be opened with less current flowing through the switches to reduce arcing; thus extending the life of the switches. As one of ordinary skill will appreciate, in many implementations the inverter 204 may include a large input "DC bus" capacitor, and after the inverter 204 is signaled to go offline, the voltage of the DC bus capacitor takes time to rise to the open circuit voltage of the array; thus there is a corresponding period of time before the current through the one or more switches is sufficiently reduced. In addition, the inverter 204 itself takes time to shut down, and as a consequence, the protection component 512 in this embodiment also includes a delay component 556 to delay the opening of the N switches until the current through the switches can been verifiably reduced and/or the inverter 204 has completed its shutdown. By delaying the opening of the switch until the current through the switch is reduced, the lifetime of the switch can be increased. In some embodiments, the inverter 204 may also be briefly operated backwards before being taken offline to accelerate the reduction of current. Beneficially, the size (and hence cost) of the N switches may be reduced due to the controlled current reduction that this embodiment (and other embodiments disclosed herein) effectuates before any switches are opened.

Figure 6:
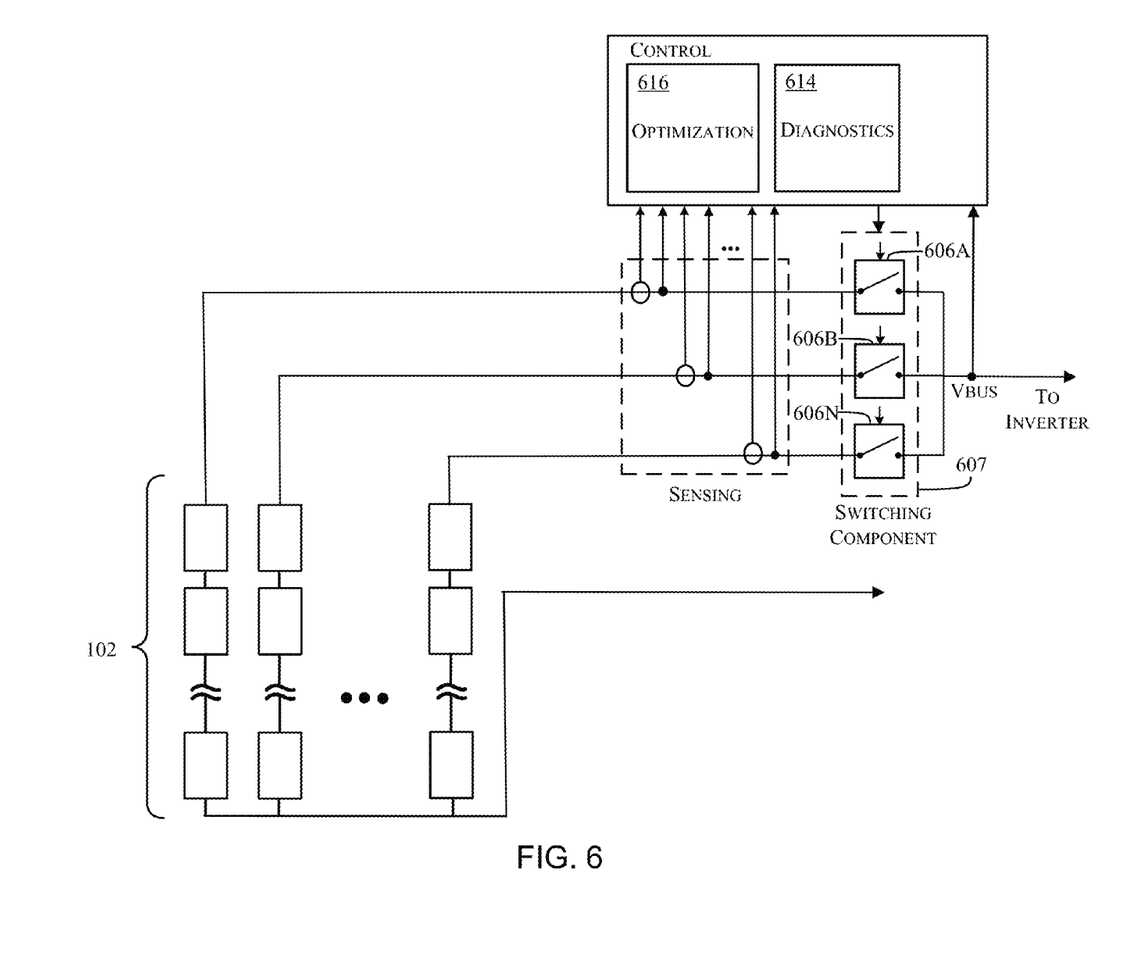
FIG. 6 depicts an embodiment in which the switching component is realized by individually addressable switches.

Referring next to FIG. 6, shown is an embodiment in which the switching component 206 is realized by a switching component 607 that includes N individually addressable switches 606A, 606B, 606N so that each of the N switches may be individually opened. One of ordinary skill in the art will appreciate that a variety of different types of controllable switches may be utilized to realize the N switches 606A, 606B, 606N, but in one exemplary embodiment, KILOVAC LEV200 sealed contactors are utilized. As shown, the individually addressable switches 606A, 606B, 606N are utilized by the optimization component 616 and the diagnostic component 614 in this embodiment. It should be recognized that the protection component 212 may certainly operate in connection with the individually addressable switches 606A, 606B, 606N, but for clarity, only the optimization component 616 and diagnostic component 614 are depicted and described with reference to FIG. 6.

Figure 8:
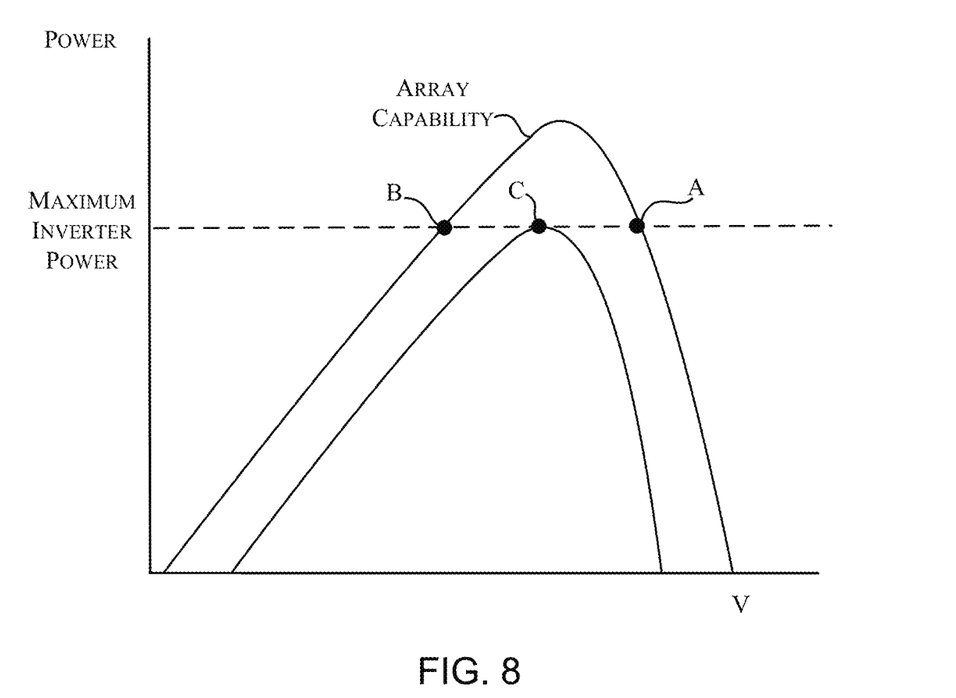
FIG. 8 is a graph depicting power versus voltage in an implementation where the maximum power capability of an array exceeds the power capability of an inverter.

With respect to optimization, there has been a trend (e.g., due to a reduction in PV module prices) to over size the array 200 so that even on cloudy days (when each of the sub-arrays 202 is generating much less than its maximum power), the array 200 as a whole is able to provide the maximum power that the inverter 204 is capable of processing. When the array 200 is oversized in this manner, on a sunny day the array 200 is capable of applying more power than the inverter 204 can process. Referring to FIG. 8 for example, shown is a graph depicting power versus voltage in an implementation where the maximum power capability of the array 200 exceeds the power capability of the inverter 204.

As shown in FIG. 8, when the power applied by the array 200 exceeds the power capability of the inverter 204, the inverter 204 may be operated at a higher voltage (at point A) so that the power applied by the inverter 204 does not exceed the inverter's maximum power, but at this higher voltage level, there is an increased level of stress placed on the switching components of the inverter 204, which may reduce the mean time to failure of the inverter 204. In the alternative, the inverter 204 may be operated at a lower voltage (at point B), but at this lower voltage, the current that is handled by the inverter 204 increases heat (and hence energy lost to heat) and may also reduce the mean time to failure of the inverter 204.

Figure 7:
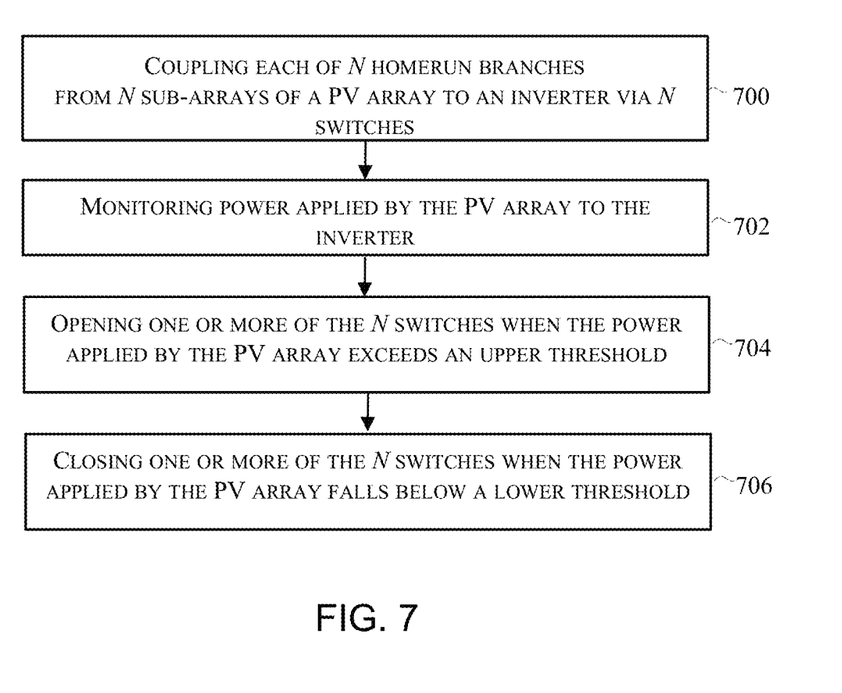
FIG. 7 is a flowchart of a method that may be carried on in connection with the embodiment depicted in FIG. 6.

In the present embodiment, the optimization component 616 is capable of opening one or more of the N switches 606A, 606B, 606N to reduce the power that is applied by the array 200 so that the inverter 204 may operate at a more optimum voltage and current (depicted by point C). Referring to FIG. 7 for example, it is a flowchart depicting a method for controlling the application of power from the N sub-arrays 202 to the inverter 204 so that the inverter 204 operates at a more optimum combination of voltage and current while providing maximum power. As shown in FIG. 7, after each of the N sub-arrays 202 are coupled to the inverter 204 via the N switches (Block 700), the power that is applied by the PV array 200 to the inverter 204 is monitored (Block 702). For example, the inverter 204 may be capable of monitoring power that is applied by the array 200 as a whole, or the sum of the currents through the homerun branches may be utilized (in connection with the voltage across the input to the inverter 204) to calculate power. As shown, one or more of the N switches 606A, 606B, 606N are opened when the power applied by the PV array 200 exceeds an upper threshold (Block 704), and one or more of the N switches 606A, 606B, 606N are closed when the power applied by the array falls below a lower threshold (Block 706). The upper and lower thresholds may be different and the values of each threshold may be configurable based upon a number of factors, but in some embodiments the upper threshold is at or near the maximum power of the inverter, and the lower threshold is a power level that is about the maximum power of the inverter minus the power applied by a single one of the sub-arrays.

As an example, in the morning all of the sub-arrays 202 may be coupled to the inverter 204, and as the sun rises and the array 200 as a whole reaches or exceeds the maximum power of the inverter 204, the sub-arrays 202 may be taken offline sub-array by sub-array to maintain the power that is applied by the array 200 at about the maximum (or optimal) power level of the inverter 204. When operated in this way, stress on the inverter 204 is reduced and as a consequence, the lifetime of inverter 204 components may increase.

Figure 9:
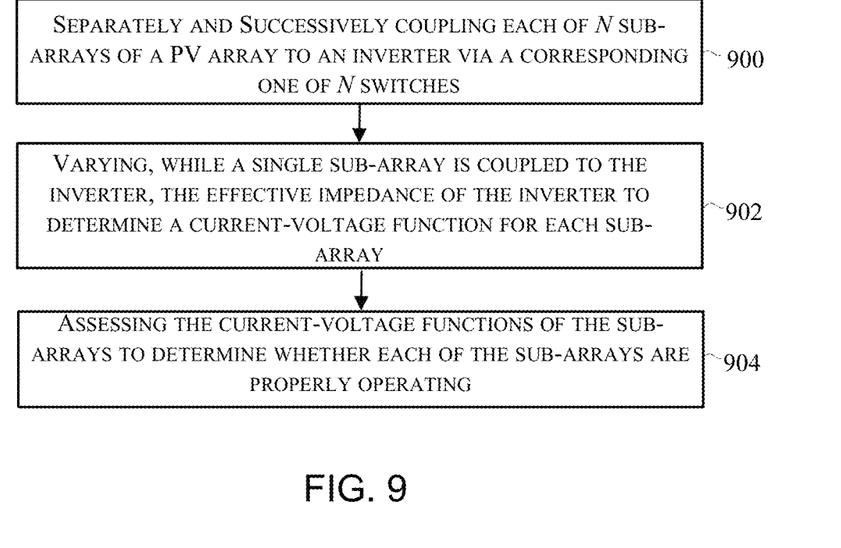
FIG. 9 is a flowchart depicting another method that may be carried out in connection with the embodiment depicted in FIG. 6.
Figure 10:
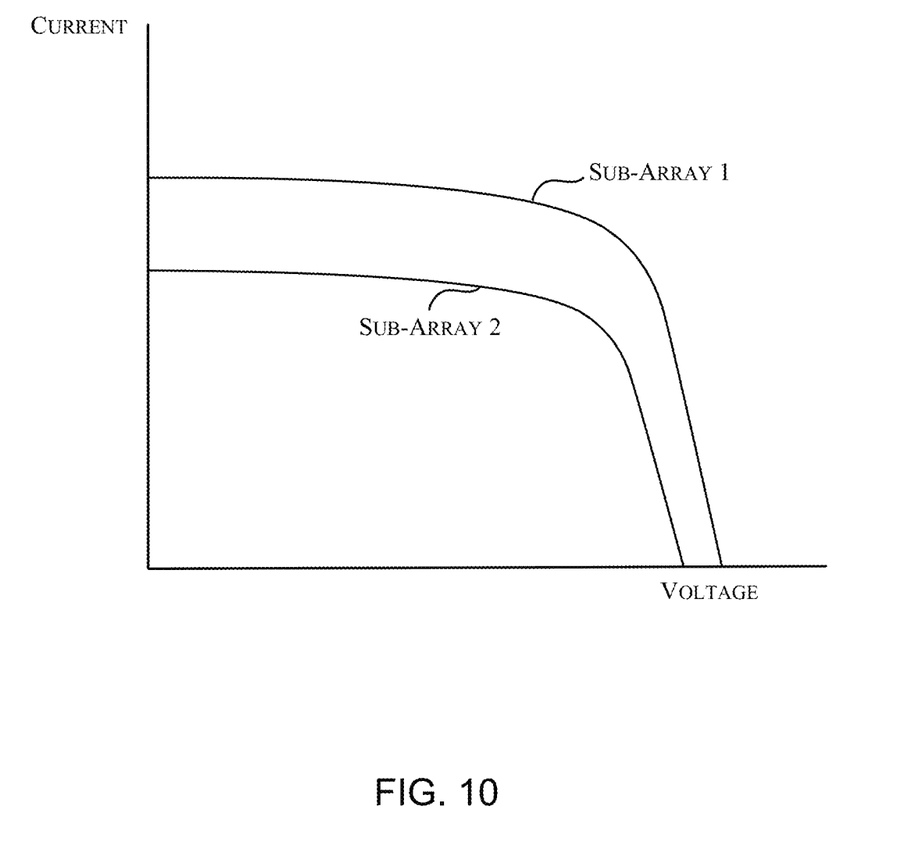
FIG. 10 is a graph depicting current-voltage functions for each of a first and second sub-arrays.

Referring next to FIG. 9, it is a flowchart depicting a method that may be carried out by the diagnostics component 614 to diagnose whether there are mismatched sub-arrays 202, and secondarily, whether there are any performance issues relative to each of the sub-arrays 202. Referring briefly to FIG. 10, for example, shown are current-voltage functions for each of a first and second sub-arrays that indicate either a mismatch between the two sub-arrays 202 or degradation of the second sub-array. Ideally each sub-array will exhibit a current-voltage function that matches the current-voltage functions of the other sub-arrays, and when the sub-arrays 202 are mismatched, the overall performance of the array 200 will be substantially reduced Referring again to FIG. 9, each sub-array is separately and successively coupled to the inverter so that only one sub-array is applying power to the inverter for a period of time (Block 900). While only one sub-array is applying power to the inverter 204, the effective impedance of the inverter 204 is varied (e.g., from a high impedance to a low impendence) and a current and voltage measurement are obtained for each of several impedance levels of the inverter 204 to obtain a current-voltage function for each sub-array (Block 902). As those of ordinary skill in the art will appreciate, the switching action of the inverter 204 may be controlled to vary the impedance of the inverter 204. The current-voltage functions of each sub-array are then assessed to determine whether the energy harvest from the array 200 is non-optimal (Block 904).

More specifically, the method depicted in FIG. 9 for generating individual sub-array current-voltage curves enables a sub-array mismatch to be automatically detected so that the mismatch may be corrected by the site operator; thus improving the overall energy harvest from the array. Additionally, the individual current-voltage curve tracing enables the operator to know how each of the sub-arrays is performing or degrading at any time.

In addition, to diagnosing whether there are mismatched sub-arrays 202, the monitoring capability provided by embodiments herein enable the diagnostics component 614 to assess operational characteristics of each sub-array in order to isolate a source of an underperforming inverter. If for example, an inverter is underperforming as compared to other inverters in a large PV array, the power characteristics of each sub-array associated with the underperforming inverter may be analyzed to isolate problematic strings. In some embodiments, each sub-array may be automatically monitored on a periodic or ongoing basis to determine whether the sub-arrays are operating as expected. For example, each of the sub-arrays 202 may utilize trackers to track a position of the sun, and if the trackers are not operating properly, the sub-array monitoring will identify the underperforming sub-arrays to expedite the problem-solving process. And the sub-array monitoring may be utilized to quickly confirm the steps take to fix any problem actually fixed the problem. Moreover, the individually-addressable switches 606A, 606B, 606C enable each sub-array to independently assessed.

Figure 11:
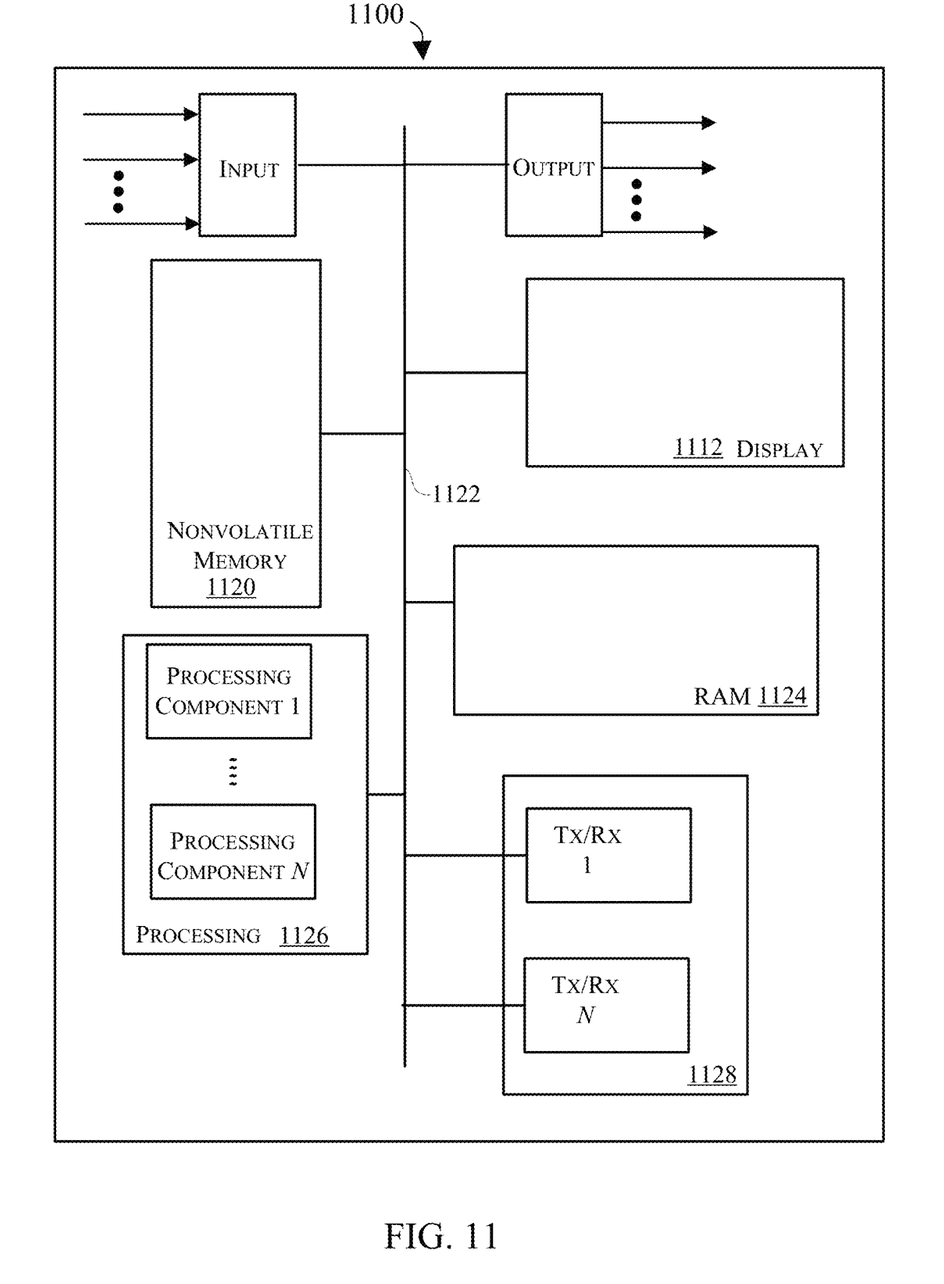
FIG. 11 is a block diagram depicting physical components that may be utilized to realize embodiments disclosed herein.

Referring next to FIG. 11, shown is a block diagram depicting physical components of an exemplary computing device 1100 that may be utilized to realize the protection, optimization, and/or diagnostics components described herein 212, 214, 216. As shown, the computing device 1100 in this embodiment includes a display portion 1112, and nonvolatile memory 1120 that are coupled to a bus 1122 that is also coupled to random access memory ("RAM") 1124, a processing portion (which includes N processing components) 1126, and a transceiver component 1128 that includes N transceivers. Although the components depicted in FIG. 11 represent physical components, the embodiments conveyed by FIG. 11 are not intended to be limited to a specific hardware architecture; thus many of the components depicted in FIG. 11 may be realized by common constructs or distributed among additional physical components. Moreover, it is certainly contemplated that other existing and yet-to-be developed physical components and architectures may be utilized to implement the functional components described with reference to FIG. 11.

This display portion 1112 generally operates to provide a user interface for a user, and in several implementations, the display is realized by a touchscreen display. In general, the nonvolatile memory 1120 functions to store (e.g., persistently store) data and non-transitory processor-executable code including code that is associated with the protection, diagnostics, and/or optimization components 212, 214, 216. In some embodiments for example, the nonvolatile memory 1120 includes bootloader code, operating system code, file system code, and non-transitory processor-executable code to facilitate the implementation of one or more portions of the protection, diagnostics, and/or optimization components 212, 214, 216.

In many implementations, the nonvolatile memory 1120 is realized by flash memory (e.g., NAND or ONENAND memory), but it is certainly contemplated that other memory types may be utilized as well. Although it may be possible to execute the code from the nonvolatile memory 1120, the executable code in the nonvolatile memory 1120 is typically loaded into RAM 1124 and executed by one or more of the N processing components in the processing portion 1126.

The N processing components in connection with RAM 1124 generally operate to execute the instructions stored in nonvolatile memory 1120 to effectuate the functional protection, diagnostics, and/or optimization components 212, 214, 216. For example, non-transitory processor-executable instructions may be utilized to effectuate the methods described with reference to FIGS. 4, 7, and 9, and these instructions may be persistently stored in nonvolatile memory 1120 and executed by the N processing components in connection with RAM 1124. As one of ordinarily skill in the art will appreciate, the processing portion 1126 may include a video processor, digital signal processor (DSP), graphics processing unit (GPU), and other processing components. In some embodiments, many aspects of the methods described with reference to FIGS. 4, 7, and 9 are carried out by the execution of non-transitory processor-executable instructions that are encoded in nonvolatile memory 1120. In other embodiments, one or more aspects of the methods described with reference to FIGS. 4, 7, and 9 are effectuated by dedicated hardware (e.g., a CPLD or FPGA) while other aspects are effectuated by execution (e.g., by the processing component 1126) of non-transitory processor-executable instructions that are encoded in the nonvolatile memory 1120. In yet other embodiments dedicated, function-specific hardware is utilized to carry out all aspects of the methods described herein.

The input component operates to receive analog and/or digital signals that are indicative of the magnitude and direction of current flowing through the homerun branches 209A, 209B, 209N. In addition, signals indicative of the voltage of the sub-arrays 202 may also be fed to the input component. The output component provides one or more signals (e.g., analog voltages) to open and close the N switches.

The depicted transceiver component 1128 includes N transceiver chains, which may be used for communicating with external devices via wireless or wireline networks. Each of the N transceiver chains may represent a transceiver associated with a particular communication scheme.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A photovoltaic energy conversion system comprising:
a photovoltaic array including a plurality of sub-arrays;
an inverter to convert direct current (DC) power from the photovoltaic array to alternating current (AC);
a DC bus coupled to an input of the inverter;
a switching component coupled between the plurality of sub-arrays and the inverter, wherein the switching component includes a plurality of individually addressable switches, each of the individually addressable switches switchably couples a corresponding one of the plurality of sub-arrays to the inverter;
a sensing component including a plurality of current sensors, each of the current sensors is coupled to a corresponding one of the plurality of sub-arrays to provide a plurality of current signals, each of the plurality of current signals indicating a magnitude and direction of current flowing through a corresponding one of the plurality of sub-arrays;
wherein the sensing component includes a plurality of voltage sensors, each of the voltage sensors is coupled to a corresponding one of the plurality of sub-arrays to provide a plurality of voltage signals;
a protection component that receives the plurality of current signals and controls the switching component to prevent forward current through any of the sub-arrays from exceeding a forward current threshold and to prevent backfeed current through any of the sub-arrays from exceeding a backfeed current threshold; and
an optimization component coupled to the sensing component, wherein a maximum power of the photovoltaic array exceeds a maximum rated power of the inverter, and wherein the optimization component monitors power applied by the photovoltaic array to the inverter and opens one or more of the individually addressable switches when the power applied by the photovoltaic array to the inverter exceeds an upper threshold, and the optimization component closes one or more of the individually addressable switches when the power applied by the photovoltaic array to the inverter falls below a lower threshold.

2. The photovoltaic energy conversion system of claim 1, wherein the protection component opens a particular individually addressable switch only if a particular faulty homerun branch experiences excessive forward or backfeed current to isolate the particular faulty homerun branch.

3. The photovoltaic energy conversion system of claim 1, wherein the optimization component opens and closes the individually addressable switches to apply, to the inverter, the maximum rated power of the inverter while providing a voltage that is less than a maximum voltage of the photovoltaic array and greater than a minimum voltage of the photovoltaic array.

4. The photovoltaic energy conversion system of claim 1, including a diagnostic component that successively closes a selected one of the plurality of individually addressable switches while all others of the plurality of individually addressable switches are open to determine a current-voltage function of each of the plurality of sub-arrays.

5. The photovoltaic energy conversion system of claim 1, wherein the protection component includes a plurality of dual-threshold-current-comparators, each of the dual-threshold-current-comparators is coupled to a corresponding one of the plurality of current sensors to detect whether current in a sub-array exceeds either a forward current threshold or a backfeed current threshold.

6. A photovoltaic DC sub-array control system comprising:
a sensing component to provide an indication of a magnitude and direction of current in each of N homerun branches of a photovoltaic array;

a switching component disposed to switchably couple each of the N homerun branches to a DC bus;

a protection component that receives the indication of the magnitude and direction of current in each of the N homerun branches and controls the switching component to prevent forward current through any of the N homerun branches from exceeding a forward current threshold and to prevent backfeed current through any of the N homerun branches from exceeding a backfeed current threshold, wherein the switching component includes N individually addressable switches so the protection component may open one or more of the N individually addressable switches at a time; and an optimization component that monitors power applied by the photovoltaic array to the DC bus, and the optimization component opens one or more of the N individually addressable switches when the power applied by the photovoltaic array exceeds an upper threshold and closes one or more of the N individually addressable switches when the power applied by the photovoltaic array falls below a lower threshold.

7. The photovoltaic DC sub-array control system of claim 6, including a diagnostics component that controls the N individually addressable switches to separately and successively couple each of the N homerun branches to an inverter via a corresponding one of the N individually addressable switches, and the diagnostics component varies, while a single sub-array is coupled to the inverter, the effective impedance of the inverter to determine a current-voltage function for each sub-array.

8. A method for controlling DC sub-arrays of a photovoltaic array, the method comprising:

coupling each of N homerun branches from N sub-arrays to an inverter via N switches;

monitoring current through each of the N homerun branches;

comparing forward current through each of the N homerun branches with a forward current threshold;

comparing any backfeed current through any of the N homerun branches with a backfeed current threshold;

opening one or more of the N switches in response to either the forward current exceeding the forward current threshold or the backfeed current exceeding a backfeed current threshold;

monitoring power applied by the photovoltaic array to the inverter;

opening one or more of the N switches when the power applied by the photovoltaic array exceeds an upper threshold; and closing one or more of the N switches when the power applied by the photovoltaic array falls below a lower threshold.

9. The method of claim 8, including opening all of the N switches simultaneously in response to either the forward current exceeding the forward current threshold or the backfeed current exceeding the backfeed current threshold.

10. The method of claim 8, including selectively opening individual ones of the N switches in response to either the forward current exceeding the forward current threshold or the backfeed current exceeding the backfeed current threshold.

11. The method of claim 8, including:

separately and successively coupling each of the N sub-arrays of the photovoltaic array to the inverter via a corresponding one of the N switches;

varying, while a single sub-array is coupled to the inverter, the effective impedance of the inverter to determine a current-voltage function for each sub-array; and assessing the current-voltage functions of the sub-arrays to determine whether each of the sub-arrays is operating properly.

\* \* \* \* \*